(12) United States Patent
Jackson

(10) Patent No.: US 8,398,349 B2
(45) Date of Patent: Mar. 19, 2013

(54) LOCKING SYSTEM AND METHOD OF USING SAME

(76) Inventor: Allen Forrest Jackson, Little Rock, AR (US)

( * ) Notice: Subject to any disclaimer, the term of this patent is extended or adjusted under 35 U.S.C. 154(b) by 292 days.

(21) Appl. No.: 12/855,516

(22) Filed: Aug. 12, 2010

(65) Prior Publication Data

US 2012/0141226 A1    Jun. 7, 2012

(51) Int. Cl.
*F16B 39/02* (2006.01)
(52) U.S. Cl. ....................................... 411/215
(58) Field of Classification Search .......... 411/315–317, 411/325, 209, 214, 215, 244
See application file for complete search history.

(56) References Cited

U.S. PATENT DOCUMENTS

| | | | |
|---|---|---|---|
| 491,276 A | | 2/1893 | Whittum |
| 684,928 A | * | 10/1901 | Fletcher .................... 411/271 |
| 699,020 A | * | 4/1902 | Schaefer .................... 411/215 |
| 821,471 A | | 5/1906 | Dowett et al. |
| 845,589 A | * | 2/1907 | Smith ........................ 411/215 |
| 854,590 A | * | 5/1907 | Musser ...................... 411/197 |
| 1,139,196 A | * | 5/1915 | Lial ........................... 411/214 |
| 1,376,624 A | * | 5/1921 | Ivory ........................ 411/244 |
| 1,408,374 A | | 2/1922 | McDonald |
| 2,879,089 A | * | 3/1959 | Kobylinski .............. 403/230 |
| 3,721,459 A | | 3/1973 | Lea |
| 3,743,343 A | | 7/1973 | Grote, Sr. et al. |
| 3,860,262 A | | 1/1975 | Goings |
| 3,866,943 A | | 2/1975 | Innis |
| 3,869,617 A | | 3/1975 | Gaussoin et al. |
| 3,874,697 A | | 4/1975 | Thompson |
| 3,899,192 A | | 8/1975 | Reddaway |
| 3,922,003 A | | 11/1975 | Lea |
| 4,124,221 A | | 11/1978 | Goings |
| 4,185,720 A | | 1/1980 | Wright, Jr. et al. |
| 4,192,522 A | | 3/1980 | Morgan |

(Continued)

FOREIGN PATENT DOCUMENTS

GB        2181396        4/1987
WO    WO2012/021598 A1    2/2012

OTHER PUBLICATIONS

U.S. Appl. No. 12/879,466, Jackson, A.

(Continued)

*Primary Examiner* — Flemming Saether
(74) *Attorney, Agent, or Firm* — Ray F. Cox, Jr.; Richard Blakely Glasgow

(57) ABSTRACT

The present invention is a system and method for fastening a second object to a first object that resists unfastening, for example due to vibration or disturbance, until unlocked. The locking system essentially comprises: a girder having one end anchored to the first object, and another end having an externally threaded terminus also defining an internally counter-threaded axial bore; a cap having an essentially planar outer face, an internally threaded transplanar bore for rotational engagement with the terminus of the girder, and a pair of domed arches on opposite sides of the transplanar bore extending from the circumference of the transplanar bore toward the periphery of the cap; and a counter-threaded bolt having a diameter smaller than the transplanar bore, a length sufficient to rotationally engage the axial bore of the girder while inserted through the transplanar bore, and a head having a pin-aperture; a pin inserted through the pin-aperture cooperating with the domed arches to prevent substantial rotation of the cap engaged with the girder terminus and the bolt engaged with the girder axial bore. The system also includes a tightening tool for tightening the cap.

11 Claims, 3 Drawing Sheets

U.S. PATENT DOCUMENTS

| | | | |
|---|---|---|---|
| 4,205,861 | A | 6/1980 | Roberts et al. |
| 4,258,929 | A | 3/1981 | Brandon et al. |
| 4,290,619 | A | 9/1981 | Goodall |
| 4,372,570 | A | 2/1983 | Goodall |
| 4,445,700 | A | 5/1984 | Schroeder |
| 4,655,468 | A | 4/1987 | Cunningham |
| 4,817,976 | A | 4/1989 | Kingsley |
| 4,858,941 | A | 8/1989 | Becker |
| 4,921,276 | A | 5/1990 | Morin |
| 5,080,397 | A | 1/1992 | Metcalf |
| 5,257,822 | A | 11/1993 | Metcalf |
| 5,277,444 | A | 1/1994 | Stropkay |
| 5,375,882 | A | 12/1994 | Koch, III |
| 5,391,032 | A * | 2/1995 | Vassalotti ............. 411/214 |
| 5,487,565 | A | 1/1996 | Thompson |
| 6,220,803 | B1 | 4/2001 | Schellhase |
| 7,748,772 | B2 | 7/2010 | Boivin et al. |
| 7,887,120 | B2 | 2/2011 | Boivin et al. |
| 7,938,475 | B2 | 5/2011 | Boivin et al. |
| 7,942,467 | B2 | 5/2011 | Boivin et al. |
| 7,942,468 | B2 | 5/2011 | Boivin et al. |
| 7,942,469 | B2 | 5/2011 | Boivin et al. |
| 7,942,470 | B2 | 5/2011 | Boivin et al. |
| 7,942,471 | B2 | 5/2011 | Boivin et al. |
| 8,113,754 | B2 * | 2/2012 | Dahl et al. ............. 411/215 |
| 2005/0077725 | A1 | 4/2005 | Bartholoma et al. |
| 2010/0066123 | A1 | 3/2010 | Ortega et al. |

OTHER PUBLICATIONS http://www.transtexcomposite, com, Trailer Skirt Air Deflector, Transtex Composite, Quebec, Montreal, Canada, 10 pages, At least as early as May 11, 2012.

http://ridgecorp.com, Ridge Corporation, Green Wing Aerodynamic Side Skirts, Pataskala, Ohio, 8 pages, At leaset as early as May 11, 2012.

http://freightwing.com, Aeroflex Trailer Skirts, Freight Wing Incorporated, 17 pages, 2004-2011.

Freight Wing Type II Class Eight Semi Trailer Aerodynamic Fuel Economy Comparison Test, Transportation Research Center, Inc., East Liberty OH, May 2004.

Bachman, L. et al., Fuel Economy Improvements and NOx Reduction by Reduction of Parasitic Losses: Effect of Engine Design, U.S.E.P.A., Date Unknown.

Bachman, L. et al., Effect of Single Wide Tires and Trailer Aerodynamics on Fuel Economy and NOx Emissions of Class 8 Line-Haul Tractor-Trailers, U.S.E.P.A, 2005.

Leuschen, J. et al., Full-Scale Wind Tunnel Tests of Production and Prototype, Second-Generation Aerodynamic Drag-Reducing . . ., National Research Council, Ottawa, Canada, 2006.

Surcel, M., Energotest 2007: Fuel Consumption Test for Evaluating Freight Wing Trailer Side Skirts, FPlnovations, Pointe-Clair, Quebec, Canada, Nov. 2007.

Surcei, M., Energotest 2008: Fuel Consumption Test for Prototypes of the Freight Wing Trailer Belly Fairing, FPlnovations, Pointe-Clair, Quebec, Canada, Oct. 2008.

Class Eight Semi Truck Aerodynamic Fuel Economy Carb Component Test, Auto Research Center, Indianapolis, Indiana, Jun. 25, 2009.

Office Action, U.S. Appl. No. 12/879,466, 10 pages, Apr. 30, 2012.

Bachman, L., et al., Fuel Economy Improvements and NOx Reduction by Reduction of Parasitic Losses, SAE Technical Paper 2006-01-3474, Oct. 31, 2006.

Notice of Allowance, U.S. Appl. No. 12/879,466, 5 pages, Mailing Date Jun. 1, 2012.

International Search Report and Written Opinion of International Searching Authority, PCT/US 2001/047222, Mailing Date: Jan. 24, 2012, 9 pages.

Office Action, U.S. Appl. No. 12/879,466, Mailing Date: Apr. 10, 2012, 5 pages.

* cited by examiner

LOCKING SYSTEM AND METHOD OF USING SAME

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

The present invention generally relates to the field of fastening and locking systems for use in any application wherein one object (or element) is to be fastened to another object, especially when one or both will be subjected to vibration, rotation or other movement tending to unfasten the objects.

Traditional screw-type fasteners have a clockwise spiral groove that corresponds with an object's threaded core for fastening. In certain instances, upon experiencing a vibration, the fastener is unwound and loosened in a counterclockwise rotation away from the object. This loosening can be dangerous in a variety of circumstances. Some fasteners attempt to combat this problem by using a fastener having a counterclockwise spiral groove that tightens during a vibration, and various other wiring wraps and methods to prevent loosening.

Current and previous locking systems do not provide a fastening system that counteracts the loosening of a fastener upon experiencing a vibration, wherein the locking system includes a girder having one end anchored to a first object and another end having an externally threaded terminus also defining an internally counter-threaded axial bore, a cap, a bolt, and a locking pin. This need affects many industries and applications, from the automobile industry (such as attaching automobile wheels to axles), the oil industry (such as drilling rig platforms) and the aircraft industry (such as aircraft nuts and bolts), to submarine propeller fastening systems and hydro power turbine fastening systems. The need also exists for small industrial and commercial fastening systems.

Therefore, a need exists for a fastening system for fastening a second object to a first object that resists unfastening until unlocked.

BRIEF SUMMARY OF THE INVENTION

Although the present invention has several embodiments, the invention described herein essentially comprises (includes):

(1) a girder having one end anchored to the first object, and another end having an externally threaded terminus also defining an internally counter-threaded axial bore;

(2) a cap having an essentially planar outer face and an internally threaded transplanar bore for rotational engagement with the terminus of the girder;

(3) a counter-threaded bolt having a diameter smaller than the transplanar bore and a length sufficient to rotationally engage the axial bore of the girder while inserted through the transplanar bore;

(4) a bolt-rotation stop means for preventing substantial rotation of the bolt engaged with the axial bore of the girder; and (5) a cap-rotation stop means for preventing substantial rotation of the cap engaged with the girder terminus.

The cap-rotation stop means and the bolt-rotation stop means include the cap planar outer face, which further includes a pair of outstanding stops on opposite sides of the transplanar bore. In one embodiment, the stops are two domed arches. The bolt further includes a head having at least one outwardly biased divergence cooperating with the stops. The outwardly biased divergence is selected from the group consisting of a spring-biased detent ball within the bolt head and protruding outwardly from an eyelet defined by the bolt head, a separate pin inserted through a pin-aperture defined by the bolt head, or other outwardly biased divergence and combinations thereof. Each of the outstanding stops on the cap extends from the circumference of the transplanar bore toward the periphery of the cap. In one embodiment, the outwardly biased divergence includes a separate pin inserted through a pin-aperture defined by the bolt head, with the pin including a pin retention means for maintaining the insertion.

The pin retention means includes an end-stop preventing complete push-through of the pin and a retraction-stop means preventing un-insertion of the pin. The retraction-stop means has at least one outwardly biased surface divergence preventing un-insertion. The outwardly biased surface divergence is selected from the group consisting of a retractable flange biased outwardly from the pin and converging toward an insertion end, a spring-biased detent ball within the pin and protruding outwardly from an eyelet defined by the pin, or other such pin and combinations thereof.

The system further includes the cap planar outer face further having a plurality of slots, and a tightening tool having a hollow cavity, a handle having a handgrip, and a plurality of prongs protruding from the tool to rotationally engage with the slots.

In another embodiment, the system comprises:

(1) a girder having one end anchored to the first object, and another end having an externally threaded terminus also defining an internally counter-threaded axial bore;

(2) a cap having an essentially planar outer face, an internally threaded transplanar bore for rotational engagement with said terminus of said girder, and a pair of outstanding stops on opposite sides of said transplanar bore extending from the circumference of said transplanar bore toward the periphery of said cap;

(3) and a counter-threaded bolt having a diameter smaller than the transplanar bore, a length sufficient to rotationally engage the axial bore of the girder while inserted through the transplanar bore, and a head having at least one outwardly biased divergence cooperating with the stops having two domed arches to prevent substantial rotation of the cap engaged with the girder terminus and the bolt engaged with the girder axial bore.

Here, the bolt further includes a pin-aperture, with outwardly biased divergence having a separate pin inserted through the pin-aperture. The pin includes an end-stop preventing complete push-through of the pin and at least one outwardly biased surface divergence preventing un-insertion, such as at least one intermediate flange allowing insertion but preventing un-insertion. The pin end-stop includes a circular ring or other such end-stop, with each of the cap outstanding stops having a domed arch abutting the pin. The system also comprises a cap planar outer face further including a plurality of slots, and a tightening tool having a hollow cavity, a handle having a handgrip, and a plurality of prongs protruding from the tool to rotationally engage with the slots.

The invention also includes a method of using the system for fastening a second object to a first object that resists unfastening until unlocked, the method comprising the steps of:

(a) providing the system including: a girder having one end anchored to the first object, and another end having an externally threaded terminus also defining an internally counter-threaded axial bore; a cap having an essentially planar outer face, an internally threaded transplanar bore for rotational engagement with the terminus of the girder, and a pair of outstanding stops on opposite sides of the transplanar bore; a counter-threaded bolt having a diameter smaller than the transplanar bore, a length sufficient to rotationally engage the axial bore of the girder while inserted through the transplanar bore, and a pin-aperture defined by the bolt head; and a pin inserted through the pin-aperture to cooperate with the stops;

(b) rotatably tightening the cap onto the girder;

(c) inserting the bolt through the cap's transplanar bore and rotatably tightening it into the girder's counter-threaded bore until the pin-aperture is within the cap outstanding stops; and (d) inserting the pin through the bolt pin-aperture.

The method also includes the step of rotatably tightening (or loosening) the cap with a tightening tool having a hollow cavity cooperating with the cap planar outer face, a handle having a handgrip, and a plurality of prongs for engaging with the cap planar outer face further comprising a plurality of slots. The method further includes the step of preventing substantial rotation that loosens the cap outwardly from the girder terminus by rotatably adjusting the bolt in the opposite direction inwardly onto the girder axial bore to a desired degree, and inserting the pin having an end-point to abut the cap outstanding stops. In one embodiment, the outstanding stops are two domed arches. The method also includes the step of preventing substantial rotation that over-tightens the cap inwardly onto the girder terminus by rotatably adjusting the bolt in the opposite direction outwardly onto the girder axial bore to a desired degree, and inserting the pin having an end-point to abut the cap outstanding stops. Also in this embodiment, the outstanding stops are two domed arches.

The system prevents the unintentional loosening (counter-clockwise rotation) of the cap in relation to the object and girder terminus upon experiencing a vibration. The girder represents any object's current threaded fastener fastened to the object, with the girder's externally threaded end defining a counter-threaded axial bore ready to receive the locking cap and the locking bolt. Once assembled, the system can be further interlocked and secured by a locking means.

The locking means includes the cap-rotation stop means for preventing substantial rotation of the cap engaged with the girder terminus, and the bolt-rotation stop means for preventing substantial rotation of the bolt engaged with the axial bore of the girder, the interlocked pin and the cap's two domed arches. Once completely installed, the cap may be further tightened clockwise or loosened counterclockwise onto the girder with a customized tool, such as a customized wrench, having a hollow cavity for covering the cap and having a plurality of prongs for inserting into the cap's vertical slots. Once the pin is inserted into the bolt's pin-aperture, the pin's retractable, intermediate flanges interlock against the bolt's pin-aperture to prevent unwanted removal. The pin's ring abuts against the bolt's pin-aperture preventing push-through and the cap's domed arches abut against the pin to prevent rotation of the cap upon experiencing a vibration as the bolt tightens further into the girder. The locking bolt is initially adjusted to a pre-determined position in relation to the cap's domed arches.

A primary object of the invention is to provide a locking cap for fastening onto a girder terminus (or end-point) and for preventing the locking cap from detaching from the object.

Another object of the invention is to provide a cap with two domed arches that will interlock with a pin.

Another object of the invention is to have a counter-threaded bolt with an aperture on its head-end for receiving a pin.

Another object of the invention is to provide a pin that inserts through a counter-threaded bolt that abuts the cap's domed arches whenever the cap attempts counterclockwise rotation.

Yet another object of the invention is to provide a counter-threaded bolt having a counterclockwise rotation for tightening within a girder axial bore.

Yet another object of the invention is to automatically cause the locking cap to travel counterclockwise and outwardly along the girder when acted upon by vibration.

Yet another object of the invention is to automatically cause the pin to travel counterclockwise inward along with the bolt within the girder's axial bore when acted upon by vibration.

Yet another object of the invention is to interlock the pin and the bolt traveling counterclockwise and inwardly, within the girder's axial bore, with the cap's two domed arches traveling counterclockwise and outwardly, along the girder's external threads.

Yet another object of the invention is to abut the locking cap's domed arches against the locking pin, interlocking the system and preventing any further counterclockwise cap movement.

Another object of the invention is to provide a tightening wrench for tightening the cap onto the girder and for providing torque to tighten and/or to remove the system from the girder.

DETAILED DESCRIPTION OF THE INVENTION

Figures 1, 2:
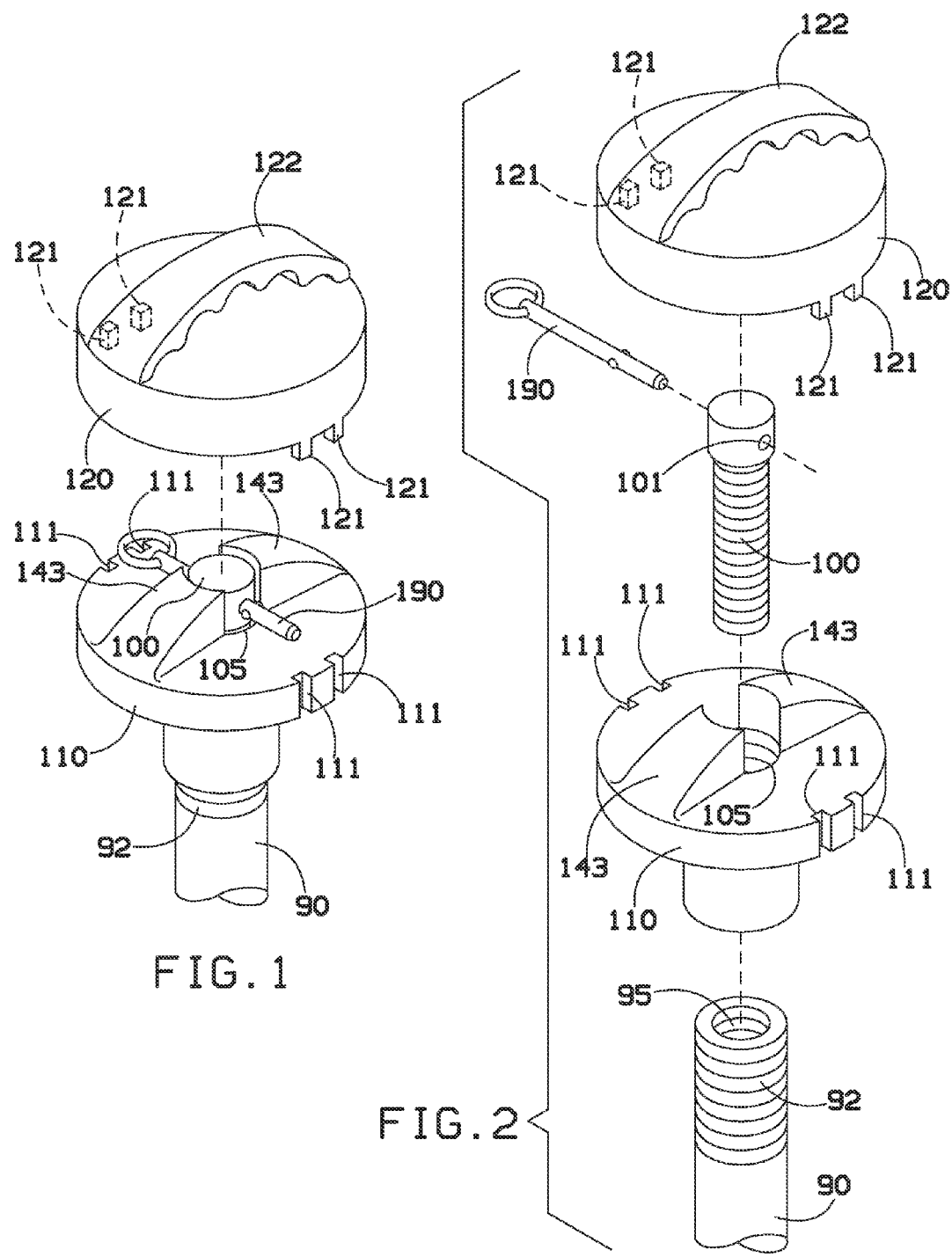
FIG. 1 depicts a perspective view of the invention.
FIG. 2 depicts an exploded view of FIG. 1.
Figure 3:
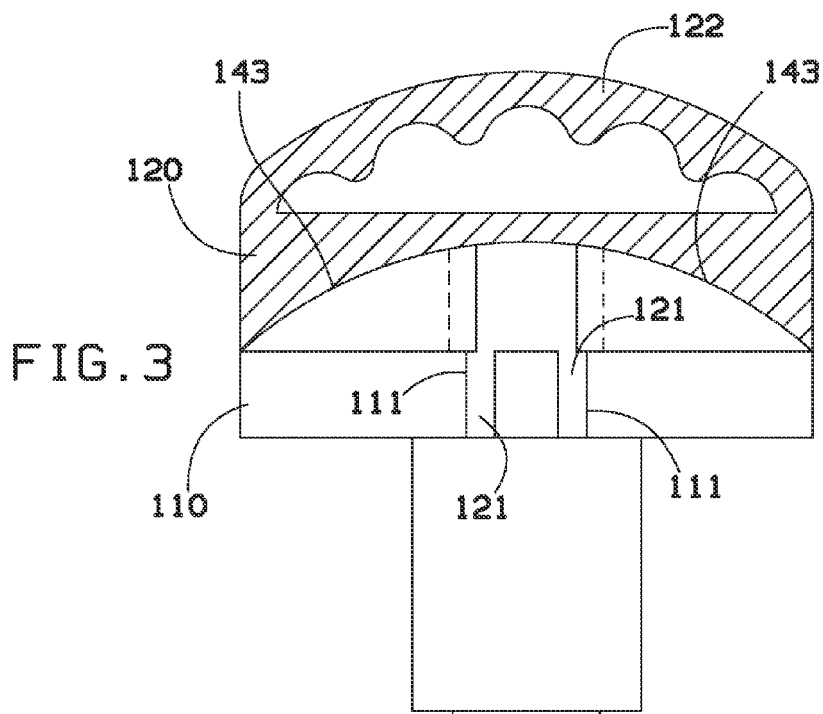
FIG. 3 depicts an elevation of FIG. 1, with the wrench shown in a cross-section view.
Figure 4:
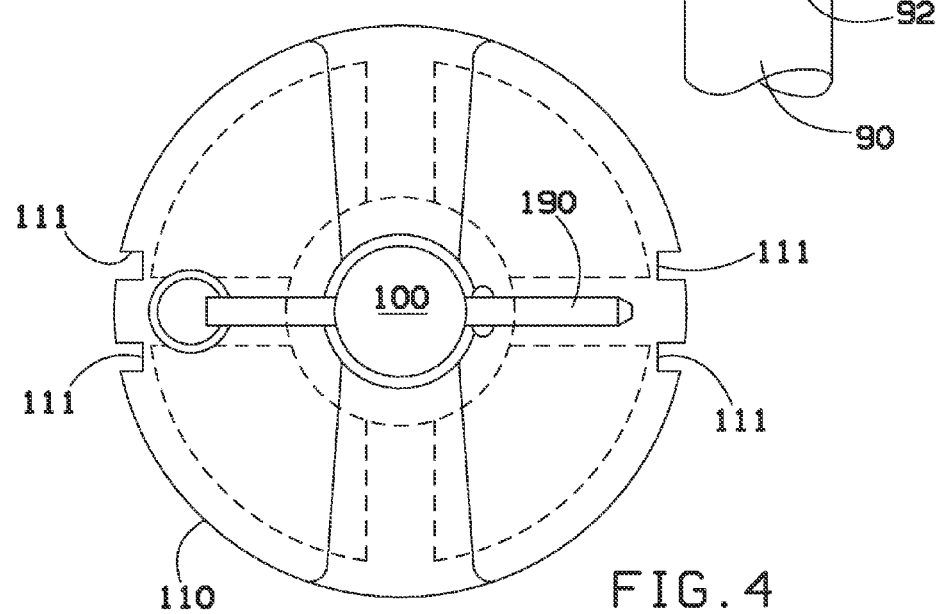
FIG. 4 depicts a top plan of FIG. 1.

For the sake of simplicity and to give the claims of this patent application the broadest interpretation and construction possible, the following definitions will apply for the following terms (and derivatives thereof):

The term "vibration" means any vibration or disturbance that forces a fastener to experience clockwise or counter-clockwise rotation. In another embodiment, the same principle may be reversed to operate with devices that originate with counterclockwise threads that loosen under clockwise rotation by reversing the threads of the cap, the bolt and the girder. Thus, the principle involves having a girder outstanding from an object having an externally threaded terminus end defining an internally counter-threaded axial bore and exchanging a previous fastener with a cap having a threaded transplanar bore, a counter-threaded bolt inserted through the cap's transplanar bore and into the girder's axial bore, then oppositionally interlocking the cap's domed arches against a locking pin inserted through the bolt's head further having a pin-aperture.

The term "object" means any item, device or system including a base for (or with) an outstanding girder (or other protrusion) to which an element or other item is fastened, especially items subjected to vibration; although objects and elements are numerous, examples include such items as an automobile wheel and axle, aircraft bolts, oil rig drilling platforms and oil field equipment, trains, ships, submarine propeller shafts, hydro power plant turbines or other turbines, and a watercraft with its propeller.

The term "girder" means any protrusion emanating or otherwise outstanding from an object, and having a terminus for a fastener.

The term "fastener" means a fastener selected from the group consisting of a nut, or any fixed retainer and any combination thereof; the fastener may be threaded.

The term "locking cap" or "cap" means any covering or fastening means over an end-point emanating from an object requiring a fastener.

The term "locking bolt" or "bolt" means any bolt or similar externally threaded member rotationally interfacing with the internal threads of a girder axial bore, and having an aperture for receiving a locking pin.

The term "locking pin" or "pin" means any element insertable into a bolt aperture, having an end-stop preventing complete push-through and having flanges (or other divergence) preventing un-insertion.

The term "domed arches" means any facet or feature upstanding from the cap; one example of such an outstanding stop is two raised arched protrusions emanating from the top region of a locking cap for abutting against a locking pin.

The term "tool" or "wrench" means a tool for tightening and loosening a cap onto a girder; one example includes a hollow cavity with prongs receivable within cooperating slots (or other voids), enabling the user to rotationally tighten or loosen the cap onto the free, externally-threaded end of the girder.

The term "tightening" means tightening any item capable of being tightened and that may also be loosened by reversing the tightening steps.

The term "aperture" means any opening within an object for receiving another object.

The term "prong" means any protrusion for inserting into a slot.

The term "slot" means any void or opening for receiving a prong.

The term "axis" means a line or point around which an object or objects rotate.

The term "inertia lock system" refers to the locking mechanism of five interconnected objects (such as a girder, a cap, a bolt, a pin, and a pair of domed arches) sharing the same axis (a line or point around which object(s) rotates) and their clockwise and counterclockwise rotations that act independently to intersect two fixed oppositional cross-members to create a locking mechanism.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Figure 5:
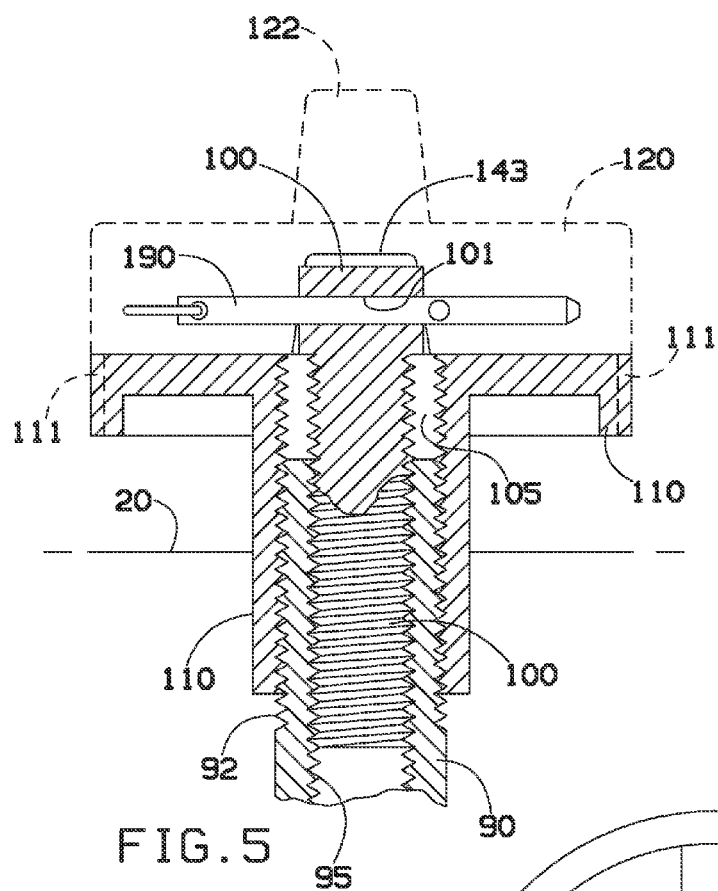
FIG. 5 depicts a cross-section view of FIG. 1.
Figure 6:
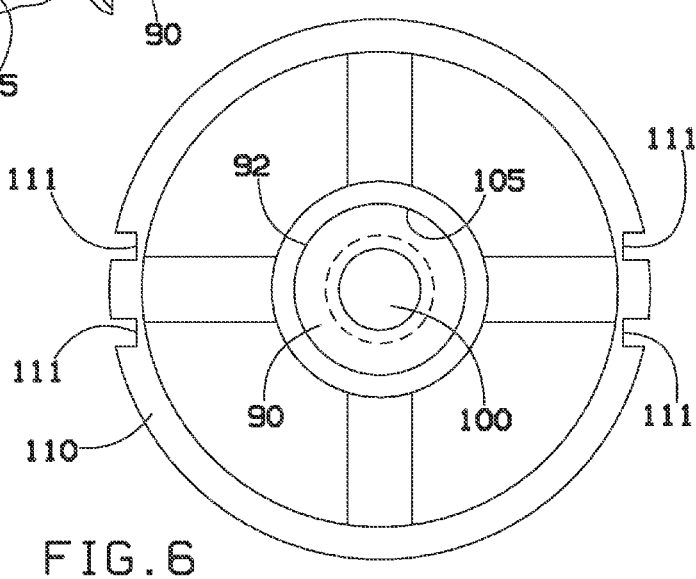
FIG. 6 depicts a bottom plan of FIG. 1.

The girder (90) essentially comprises any shaft arising out of (or anchored to) a first object for fastening to a second object (20) having an externally threaded terminus (or end-point) (92) defining an internally counter-threaded axial bore (95). The girder's (90) externally threaded end-point (92) rotatably receives a cap (110). The girder (90) extends through (and essentially impales) the first object, the cap (110) is screwed onto the girder terminus (92) a sufficient number of rotations to achieve the desired amount of fastening, the bolt (100) is inserted through the cap's (110) bore (105) and counter-screwed into the girder's (90) axial bore (95) a sufficient number of rotations to facilitate maintenance of the desired amount of fastening, such that the bolt-rotation stop means is activated and the cap-rotation stop means is activated. FIG. 5 depicts a representative surface of the second object (20) fastened by the girder (90) to a first object (not shown).

The cap (110) is essentially formed of any material, polymer or steel, or any other comparable material having a centrally internally threaded transplanar bore (or aperture) (105) sufficient to produce interlocking threads between the girder (90) and the locking cap (110). The locking cap further includes an essentially planar outer face and two domed arches (143). The opening between the domed arches forms the aperture (105) for receiving a locking bolt (100). In one embodiment, the threading of the locking cap's aperture (105) begins below the aperture between the two domed arches (143).

The counter-threaded bolt (100) comprises a counter-threaded spiral bolt having a length that inserts through the cap (110) aperture (105) and further inserting into the counter-threaded bore (95) of the girder (90). The length of the bolt (100) is sufficiently long enough to produce a holding resistance within the girder (90). Because the diameter of the bolt (100) is smaller than the diameter of the locking cap's aperture (105), the bolt (100) easily passes through the opening (105) between the domed arches (143), down through the locking cap's aperture (105) and into the girder (90) counter-threaded axial bore (95). Further, the locking bolt (100) can be completely inserted into the girder's axial bore (95) until the bolt (100) bottoms out against the girder (90) end-point. The locking bolt (100) further comprises a pin-aperture (101) for receiving a locking pin (190). During vibration, the locking pin (190) turns counterclockwise inward with the bolt's (100) counterclockwise inward movement, until the pin (190) abuts one of the locking cap's domed arches (143). During these counterclockwise rotations, a locking mechanism is created, stopping any further counterclockwise movement of the cap (110). Thus, when the bolt (100) interconnects with the locking pin (190) and the cap (110) domed arches (143), no rotational movement of the cap (110) is allowed.

The pin (190) is a stainless steel push-pin, or any other type of a composite material comprising a pin, and essentially comprises a pair of retractable, intermediate flanges and a ring or other such end-stop for blocking push-through and for gripping. The pin (190) impales through the bolt's (100) aperture (101) and is secured to the bolt (100) by the pin's (190) retractable flanges. Counterclockwise rotation due to experiencing a vibration is prevented when the pin (190), traveling in the same counterclockwise inward rotation as the bolt (100), abuts one of the cap's (110) domed arches (143) due to the cap's (110) counterclockwise outward rotation, thereby creating the locking mechanism.

The wrench (120) essentially includes a hollow cavity, a handle (122) having a handgrip and a plurality of prongs (121) extending downwardly from the wrench. The wrench (120) fits over the cap (110) and engages its prongs (121) with the cap's (110) vertical slots (111) to tighten or loosen the cap (110). To tighten, the wrench (120) bears down against the cap (110) and is turned clockwise with the handle (122), thereby tightening the cap (110) downwardly over the girder's (90) threaded end-point (92). To remove the cap (110), the pin (190) is first removed from the bolt's (100) aperture (101), then the wrench's (120) prongs (121) are inserted over the cap (110) and into the cap's vertical slots (111), followed by turning the wrench (120) counterclockwise to rotate the cap (110) outwardly from the girder's (90) externally threaded end-point (92) for removal.

The method of using one embodiment of the invention comprises the steps of (a) providing the system comprising a girder (90) having one end (91) anchored to a first object, and another end having an externally threaded end-point (92) also defining an internally counter-threaded axial bore (95); a cap (110) having an essentially planar outer face, an internally threaded transplanar bore (105) for rotational engagement with the terminus (92) of the girder (90), and a pair of domed arches (143) on opposite sides of the transplanar bore (105); a counter-threaded bolt (100) having a diameter smaller than the transplanar bore (105), a length sufficient to rotationally engage the axial bore (95) of the girder (90) while inserted through the transplanar bore (105), and a pin-aperture (101) defined by the bolt head; and a pin (190) inserted through the pin-aperture (101) to cooperate with the domed arches (143);

(b) rotatably turning clockwise and tightening the cap (110) onto the girder (90) threaded end-point (92);

(c) inserting the bolt (100) through the cap's transplanar bore (105) and rotatably tightening it into the girder's (90) counter-threaded bore (95) until the pin-aperture is within the cap (110) domed arches (143); and (d) slidably inserting a locking pin (190) through the bolt (100), with the pin (190) having an end-stop ring and a pair of retractable flanges for preventing un-insertion.

The method further comprises the step of rotatably tightening the cap (110) with a tightening tool (or wrench) (120) having a hollow cavity cooperating with the cap (110) planar outer face, a handle (122) having a handgrip, and a plurality of prongs (121) for engaging with the cap (110) planar outer face further having a plurality of slots (111). This step further tightens the cap (110) onto the girder (90). To loosen or remove the cap (110), the step includes removing the pin (190) and loosening the cap (110) by turning the wrench (120) and the cap (110) counterclockwise away from the object's base surface (20).

The method further comprises the step of preventing substantial rotation that loosens the cap outwardly from the girder (90) terminus (92) by rotatably adjusting the bolt (100) in the opposite direction inwardly onto the girder (90) axial bore (95) to a desired degree, and inserting the pin (190) having an end-point to abut the cap (110) outstanding stops comprising two domed arches (143). Finally, the method further comprises the step of preventing substantial rotation that over-tightens the cap (110) inwardly onto the girder (90) terminus (92) by rotatably adjusting the bolt (100) completely inward into the girder (90) axial bore (95), and inserting the pin (190) having an end-point to abut the cap (110) outstanding stops comprising two domed arches (143). These steps prevent the cap (110) from counterclockwise rotation during any vibration by rotatably tightening the bolt (100) counterclockwise within the cap (110) and completely into the girder (90) axial bore (95) until it bottoms out, and then inserting the locking pin (190) through the bolt's pin-aperture (101) and abutting the cap's (110) pair of domed arches (143), thereby preventing further clockwise rotation of the cap (110). Therefore, as the cap (110) attempts to rotate counterclockwise outwardly, the interlocked pin (190), and consequently the bolt (100), also rotates counterclockwise and inwardly and locks against the cap's (110) domed arches (143) also preventing any further counterclockwise cap (110) rotation.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A system for fastening a second object to a first object that resists unfastening until unlocked, said fastening system comprising:
   a. a girder having one end anchored to the first object, and another end having an externally threaded terminus also defining an internally counter-threaded axial bore;
   b. a cap having an essentially planar outer face and an internally threaded transplanar bore for rotational engagement with said terminus of said girder; and
   c. a counter-threaded bolt having a diameter smaller than said transplanar bore and a length sufficient to rotationally engage said axial bore of said girder while inserted through said transplanar bore;
   d. said cap planar outer face further including a pair of stops on opposite sides of said transplanar bore extending outwardly from the planer surface and;
   e. said bolt having a head cooperating with said stops for preventing substantial relative rotation of said bolt with said girder.

2. The system of claim 1, said bolt head having at least one outwardly biased divergence cooperating with said stops; said outwardly biased divergence selected from the group consisting of a spring-biased detent ball within said bolt head and protruding outwardly from an eyelet defined by said bolt head, a separate pin inserted through a pin-aperture defined by said bolt head, or any other divergence cooperating with said stops.

3. The system of claim 2, said outwardly biased divergence comprising a separate pin inserted through a pin-aperture defined by said bolt head, said pin including an end-stop preventing complete push-through of said pin and a retraction-stop comprising at least one outwardly biased surface divergence preventing un-insertion.

4. The system of claim 3, said pin end-stop comprising a circular ring, each of said cap outstanding stops comprising a domed arch abutting said pin.

5. The system of claim 4, said outwardly biased surface divergence selected from the group consisting of a retractable flange biased outwardly from said pin and converging toward an insertion end, a spring-biased detent ball within said pin and protruding outwardly from an eyelet defined by said pin, or any other pin having an outwardly biased surface divergence.

6. The system of claim 2, each of said stops on said cap extending from the circumference of said transplanar bore toward the periphery of said cap.

7. The system of claim 2, said system further comprising said cap planar outer face further comprising a plurality of slots, and a tightening tool having a hollow cavity, a handle having a handgrip, and a plurality of prongs protruding from said tool to rotationally engage with said slots.

8. A system for fastening a second object to a first object that resists unfastening until unlocked, said fastening system comprising:

a. a girder having one end anchored to the first object, and another end having an externally threaded terminus also defining an internally counter-threaded axial bore;
b. a cap having an essentially planar outer face, an internally threaded transplanar bore for rotational engagement with said terminus of said girder, and a pair of outstanding stops on opposite sides of said transplanar bore extending from the circumference of said transplanar bore toward the periphery of said cap; and
c. a counter-threaded bolt having a diameter smaller than said transplanar bore, a length sufficient to rotationally engage said axial bore of said girder while inserted through said transplanar bore, and a head having at least one outwardly biased divergence cooperating with said stops having two domed arches to prevent substantial rotation of said cap engaged with said girder terminus and said bolt engaged with said girder axial bore; said bolt further comprising a pin-aperture, said outwardly biased divergence comprising a separate pin inserted through said pin-aperture, said pin having an end-stop preventing complete push-through of said pin and at least one outwardly biased surface divergence preventing un-insertion.

9. The system of claim 8, said surface divergence comprising at least one intermediate flange allowing insertion but preventing un-insertion.

10. The system of claim 8, said pin end-stop comprising a circular ring, each of said cap outstanding stops comprising a domed arch abutting said pin.

11. The system of claim 8, said system further comprising said cap planar outer face further comprising a plurality of slots, and a tightening tool having a hollow cavity, a handle having a handgrip, and a plurality of prongs protruding from said tool to rotationally engage with said slots.

* * * * *